(12) United States Patent
Simon

(10) Patent No.: US 10,729,122 B1
(45) Date of Patent: Aug. 4, 2020

(54) OUTDOOR ROBOTIC DEVICE FOR ERADICATION OF TICKS

(71) Applicant: Madelyn Jane Simon, New York, NY (US)

(72) Inventor: Madelyn Jane Simon, New York, NY (US)

(*) Notice: Subject to any disclaimer, the term of this patent is extended or adjusted under 35 U.S.C. 154(b) by 0 days.

(21) Appl. No.: 16/854,572

(22) Filed: Apr. 21, 2020

Related U.S. Application Data

(63) Continuation-in-part of application No. 16/186,886, filed on Nov. 12, 2018, now abandoned.

(60) Provisional application No. 62/585,115, filed on Nov. 13, 2017.

(51) Int. Cl.
*A01M 5/08* (2006.01)
*A01M 13/00* (2006.01)

(52) U.S. Cl.
CPC ............ *A01M 5/08* (2013.01); *A01M 13/003* (2013.01); *A01M 2200/011* (2013.01)

(58) Field of Classification Search
CPC . A01M 5/08; A01M 13/003; A01M 2200/011
USPC .......................................................... 43/140
See application file for complete search history.

(56) References Cited

U.S. PATENT DOCUMENTS

| | | | | |
|---|---|---|---|---|
| 1,156,778 A | * | 10/1915 | Hesterly | A01M 5/08 43/140 |
| 1,989,405 A | * | 1/1935 | Dillman | A01M 5/08 43/140 |
| D393,040 S | * | 3/1998 | Nishida | D22/122 |
| 5,974,728 A | * | 11/1999 | Nichols | A01M 1/06 43/140 |
| 6,459,955 B1 | * | 10/2002 | Bartsch | A47L 9/00 700/245 |
| 10,021,871 B1 | * | 7/2018 | Cogley | A01M 1/145 |
| 10,091,981 B1 | * | 10/2018 | Cogley | A01M 1/223 |
| 2012/0137569 A1 | * | 6/2012 | Younts | A01M 1/026 43/139 |
| 2018/0027796 A1 | * | 2/2018 | Tugel | A01M 1/223 |

FOREIGN PATENT DOCUMENTS

| | | | | |
|---|---|---|---|---|
| EP | 3036987 A1 | * | 6/2016 | ............ A01M 7/005 |
| GB | 2329100 A | * | 3/1999 | ............ A01M 3/005 |
| KR | 101227451 B1 | * | 2/2013 | ............ A01M 5/08 |
| WO | WO-2013168079 A1 | * | 11/2013 | ............ A01M 5/00 |

* cited by examiner

*Primary Examiner* — Christopher P Ellis
(74) *Attorney, Agent, or Firm* — Leason Ellis LLP

(57) ABSTRACT

Disclosed herein are robotic devices which traverse a predefined coverage area in order to capture and eradicate ticks in the area. A vacuum mechanism provides a suction force for pulling ticks into the device through a frontal opening, after which the ticks are captured in a receptacle and crushed by at least one rotating arm. In certain embodiments, the devices include heat strips near the frontal opening of the device that mimic the human body temperature. Additionally, the device can include carbon dioxide emitters that pass carbon dioxide to the receptacle or through the frontal opening to increase attraction of ticks.

20 Claims, 8 Drawing Sheets

OUTDOOR ROBOTIC DEVICE FOR ERADICATION OF TICKS

CROSS-REFERENCE TO RELATED APPLICATIONS

This application is based on and claims priority to U.S. Provisional Patent Ser. No. 62/585,115, filed Nov. 13, 2017, and is a continuation-in-part of U.S. patent application Ser. No. 16/186,886, filed on Nov. 12, 2018, both of which are hereby incorporated by reference as if set forth in their respective entireties herein.

FIELD OF THE INVENTION

This invention generally relates to robotic vehicle systems, and more particularly to robotic vehicle systems for eradicating desired bugs, insects, arachnids, and the like from an area.

BACKGROUND OF THE INVENTION

Many small creatures live in grassy areas of the world that are imperceptible or difficult for human eyes to see, such as bugs, insects or arachnids. Some of these creatures pose danger to humans and animals living in the area. In particular, ticks infest the skin of animals and humans, and transmit dangerous and, often, deadly diseases. Tick populations are of particular danger in warm and humid climates.

Current methods of controlling tick populations involve chemicals, such as sprays, to kill ticks, which can be toxic for children and pets. Further, chemical sprays on landscapes drain into the aquafers and affect well water. As such, there exists a need in the art for an effective way to control tick populations that is safe for humans. In particular, there is a need to safely attract, capture, and dispose of ticks without human interaction or handling.

It is in regard to these issues that the present application is provided.

SUMMARY OF THE INVENTION

According to a broad aspect of the invention, robotic devices are provided that can patrol areas and eradiate ticks. In one or more embodiments, the robotic devices are robotic vehicles having one or more wheels and an on-board power source. For example, the power source can be a rechargeable battery and the device can have a charging dock for coupling to a charging station. The devices include a housing having a housing opening that extends the entire width of a front surface of the housing. In at least one aspect, the housing opening has a height of between 1-3 inches and preferably is located on the front surface of the housing at a height of 2-4 inches from the ground. Moreover, in at least one aspect, the housing opening is located on the front surface of the housing at a height of 1-4 inches from the bottom of the device, and preferably is disposed between one to two inches from the bottom of the device. Further, a receptacle is disposed within the housing, at least one rotatable arm is disposed within the receptacle, and a vacuum mechanism is disposed within the housing and arranged to generate a suction force through the opening to the receptacle when activated by the power source. One or more passageways can couple the housing opening and the receptacle. The receptacle can include one or more openings at the interface of the first passageway and the receptacle is sized and shaped to pass ticks through. For example, a portion of the receptacle surface includes a permeable air filter sized and shaped to pass the suction force through the receptacle, but not to pass captured ticks.

The rotatable arm disposed within the receptacle abuts an inner surface of the receptacle and moves along the circumference of the inner surface of the receptacle by rotating up to 360 degrees when activated. The arm can be hook or arcuate-shaped. The rotatable arm includes a flexible portion that can be composed of rubber or vinyl. The flexible portion can be disposed at the end of the arm and be the portion that contacts the inner surface of the receptacle.

Continuing with this aspect of the invention, the device includes various additional elements. In one or more embodiments, the device includes a screw off cap at least one end of the receptacle for permitting access to contents of the receptacle. In one or more embodiments, the device includes a flexible film which covers the housing opening when the vacuum mechanism is not generating the suction force, and which flexes to reveal the housing opening when the vacuum mechanism generates the suction force. In one or more embodiments, the device has a carbon dioxide emitter that dispenses carbon dioxide through the housing opening. The carbon dioxide emitter can be disposed within the receptacle or otherwise be arranged to pass carbon dioxide to the receptacle. In one or more embodiments, the device includes one or more heat strips disposed at the housing opening. Such heat strips emit heat between 95-100 degrees Fahrenheit. In one or more embodiments, the device includes one or more of a rain sensor, a bumper sensor, or a theft deterrent.

In accordance with another aspect of the invention, embodiments of the robotic devices include robotic vehicles having a power source, a housing having a housing opening on a front surface of the housing, a receptacle disposed within the housing, the receptacle containing two rotatable arms, and a vacuum mechanism disposed within the housing and arranged to provide a suction force through the opening to the receptacle when activated by the power source. The flexible portion of each of the rotatable arms abuts part of an inner surface of the receptacle and moves along the circumference of the inner surface of the receptacle when activated by the power source. Further, in one or more embodiments, the device includes a first rotatable arm that moves in a clockwise direction and a second rotatable arm that moves in a counter-clockwise direction. In one or more embodiments, each of the rotatable arms rotate up to 360 degrees.

BRIEF DESCRIPTION OF THE DRAWINGS

The accompanying drawing figures illustrate exemplary embodiments and are not intended to be limiting of the invention. Among the drawing figures, like references are intended to refer to like or corresponding parts.

DETAILED DESCRIPTION OF CERTAIN EMBODIMENTS OF THE INVENTION

Figure 1:
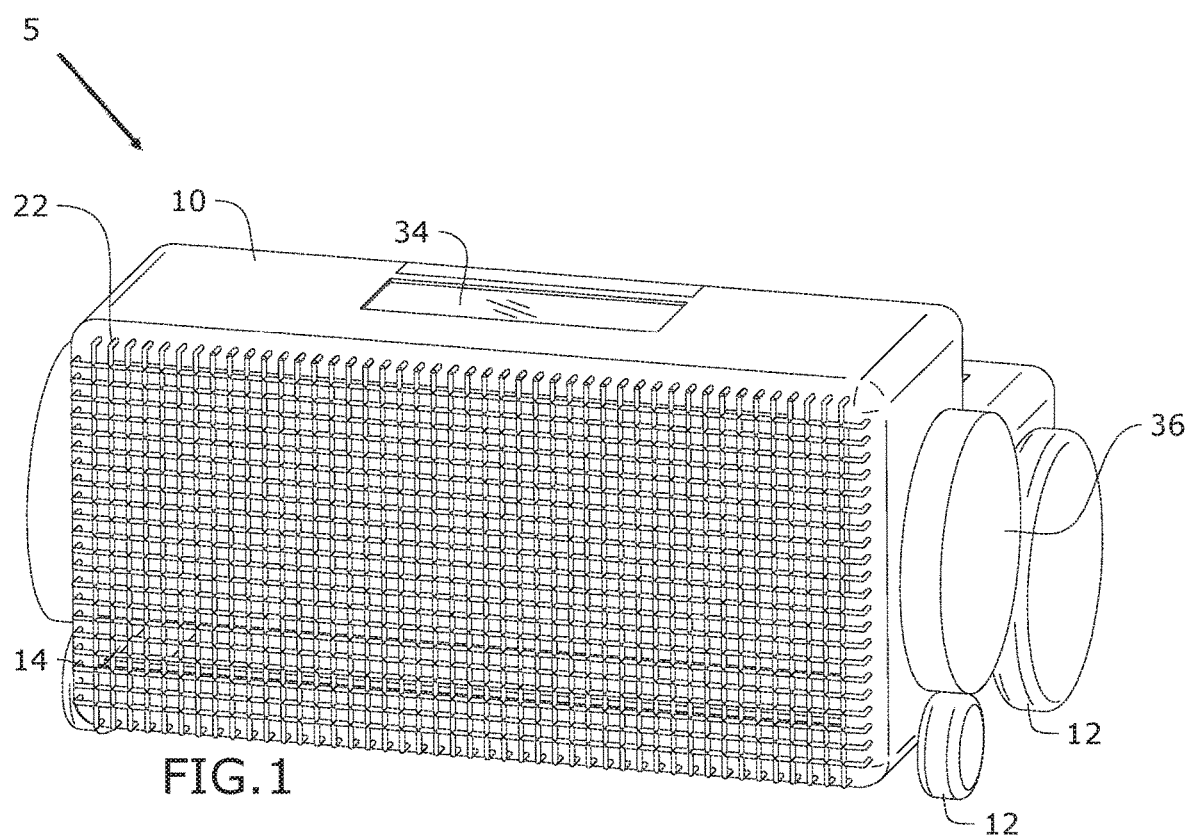
FIG. 1 is a front perspective view of a device in accordance with at least one embodiment of the present application.

The invention is now described with reference to the accompanying drawings, which form a part hereof, and which show, by way of illustration, example implementations and/or embodiments of the present invention. It is to be understood that other embodiments can be implemented and structural changes can be made without departing from the spirit of the present invention. Among other things, for example, the disclosed subject matter can be embodied as methods, devices, components, or systems.

Furthermore, it is recognized that terms may have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

As described herein, the present invention is directed toward satisfying the need in the art for a way to control tick population. While the disclosure is directed primarily toward capturing and eradicating ticks, the systems and methods herein may be applicable to capturing and eradicating other pests. Specifically, the present application describes various embodiments in which a robotic vehicle patrols a defined surface area to eradicate the ticks therein. The patrol coverage area can be defined by GPS, or by perimeter sensor strips or strategically located sensor stations outlining the property to be patrolled. Such sensors provide an invisible "fence" that keeps the robotic vehicle in the desired coverage area. The robotic vehicle is powered by an on-board power source, such as a lithium-ion battery. The vehicle includes a battery docking coupling for docking with a charging station to recharge—i.e., the vehicle's "home." Advantageously, the charging station can be located in the coverage area so that when the vehicle is done patrolling, it can return home without user intervention. In one or more embodiments, the robotic vehicle can be remotely controlled by a user.

In terms of operation, in one or more embodiments herein, the robotic device captures ticks in the coverage area via an opening on the front surface of the vehicle—i.e., the surface facing the direction of travel. This opening is preferably very wide, up to the width of the vehicle itself, but narrow in height so as to permit ticks into the opening and to limit capture of unwanted larger debris—e.g., twigs, rocks, etc. To assist with limiting external debris, a flexible film or flap can be placed over the opening, and a wire screen or cage can be placed on the front surface of the vehicle.

Ticks are drawn into the opening in a few different ways. First, a vacuum mechanism is disposed within the vehicle housing that is powered by the power source to generate a suction force through the vehicle opening. The vehicle can include internal passageways, meshes, filters, and the like to facilitate airflow from the vacuum mechanism to the opening. The suction force advantageously can also pull back any flexible film that is used to cover the opening on the front surface of the vehicle. Second, the robotic vehicle can include one or more heat emitting devices at or adjacent to the opening to increase the odds of luring ticks into the opening. For example, one or more heat strips can be included that run the longitudinal width of the opening, such as along the outer surface or embedded within each of an upper and lower lip of the opening. In other examples, the heat emitters can be singular devices placed strategically at or near the opening—e.g., equidistant to one another at the front surface of the vehicle or the opening. Preferably, the heat emitters generate heat at approximately the human body temperature to improve tick attraction. Third, the robotic vehicle can include one or more carbon dioxide emitters. Ticks are known to be attracted to carbon dioxide, so by emitting such through the opening or otherwise within the housing of the vehicle, tick attraction can be further improved. The above attraction elements can be combined in various ways in various embodiments. For example, ticks can be initially drawn to the movement of the vehicle and by the heat emitters, then are induced to enter through the opening by the carbon dioxide emission wherein the suction force provided by the vacuum mechanism completes capture.

Once ticks are drawn into the opening in the above ways, they are captured in a receptacle within the housing. The receptacle can be, for example, a cylinder or canister that is equivalent in length to the opening and itself has openings or passageways to permit ticks to enter the receptacle. Preferably, the receptacle is designed to permit free airflow for the suction force generated by the vacuum mechanism, though such airflow design is limited so as to not permit ticks to pass through the airflow filters or other openings aside from the ones meant to capture ticks that come through the opening of the front surface of the vehicle. For example, as most ticks are approximately 2-3 mm long, the mesh of an airflow filter can comprise dimensions of 1 mm by 1 mm, which is sufficient for airflow to permeate the filter, but not large enough for ticks to pass through. In one or more embodiments, such airflow filters or meshes comprise a portion of the surface of the receptacle. In other embodiments, the entire receptacle is designed to permit airflow. The carbon dioxide emitter discussed above can be optionally placed within the receptacle or adjacent to the receptacle so as to pass carbon dioxide into the chamber to additionally induce ticks to enter. For example, the carbon dioxide emitter can be disposed adjacent to the outer surface of the receptacle, such as adjacent to the airflow filter. Carbon dioxide emission can be further facilitated via passageways or internal tubing within the vehicle.

As provided herein, ticks that are captured in the receptacle are thereafter eradicated. In one or more embodiments, a rotatable arm is disposed within the receptacle. The arm is designed to rotate a complete 360 degrees while contacting the inner circumference of the receptacle. Such rotation can be achieved by coupling the arm to an inner shaft or rod centrally located within the receptacle, and is powered by the power source. In this way, ticks that are captured in the receptacle are crushed as the arm passes over them. The rotatable arm can be shaped as a straight arm, a hook or an arcuate-shape, or other design as is appropriate according to the size and shape of the receptacle. In one or more embodiments, the end of the rotatable arm includes a flexible portion that bends as the arm sweeps the inner surface of the receptacle in order to achieve greater sweeping and tick-crushing coverage. The flexible portion can be made of rubber or vinyl, and can be a pad or cap that can be removed from the arm for cleaning, maintenance, or replacement.

Figure 2:
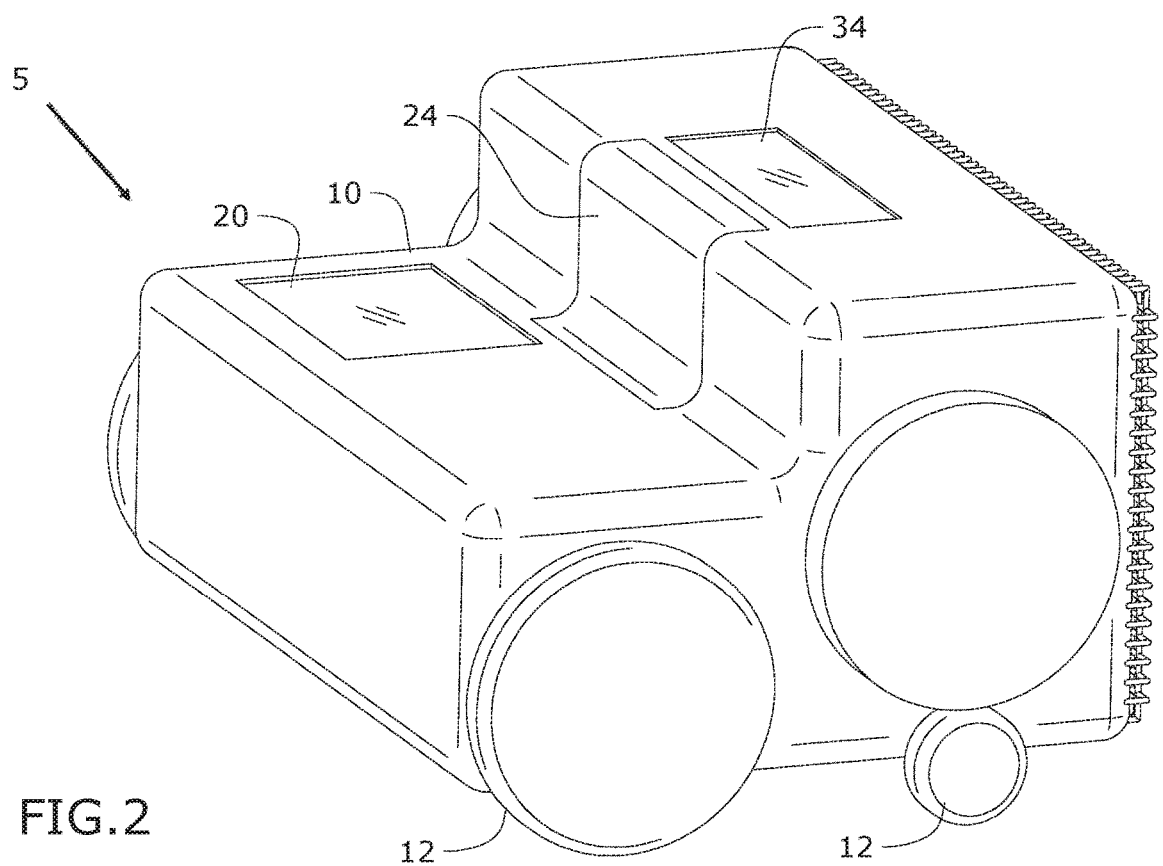
FIG. 2 is a side perspective view of a device in accordance with at least one embodiment of the present application.
Figure 3:
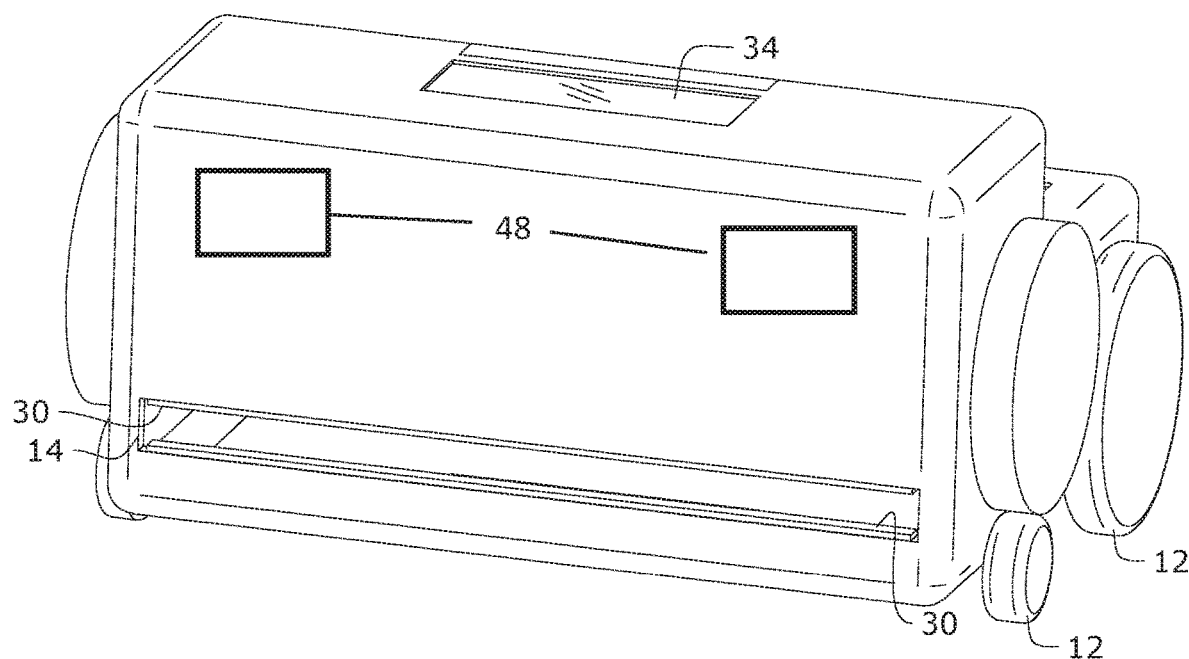
FIG. 3 is a front perspective view of a device in accordance with at least one embodiment of the present application.
Figure 4:
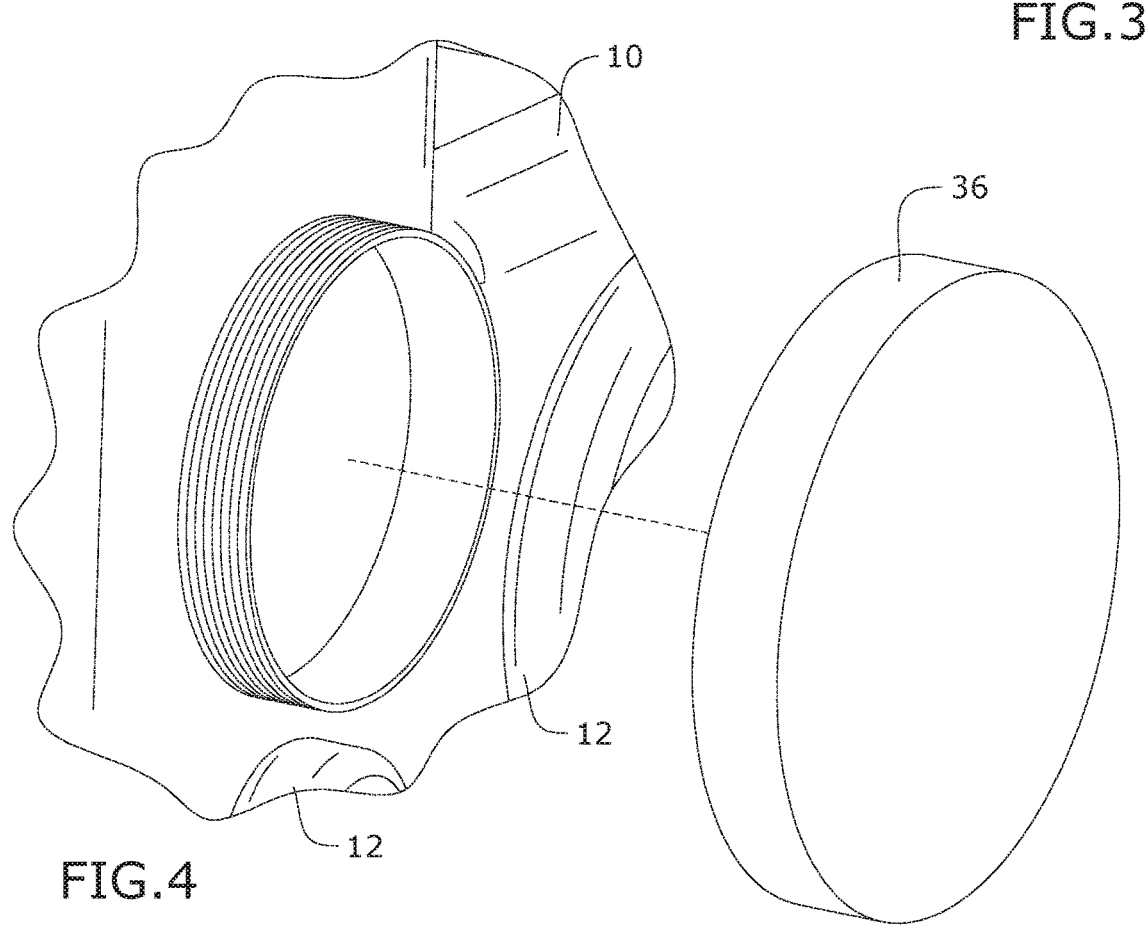
FIG. 4 is a detail exploded view of the screw-off cap of a device in accordance with at least one embodiment of the present application.
Figure 6A:
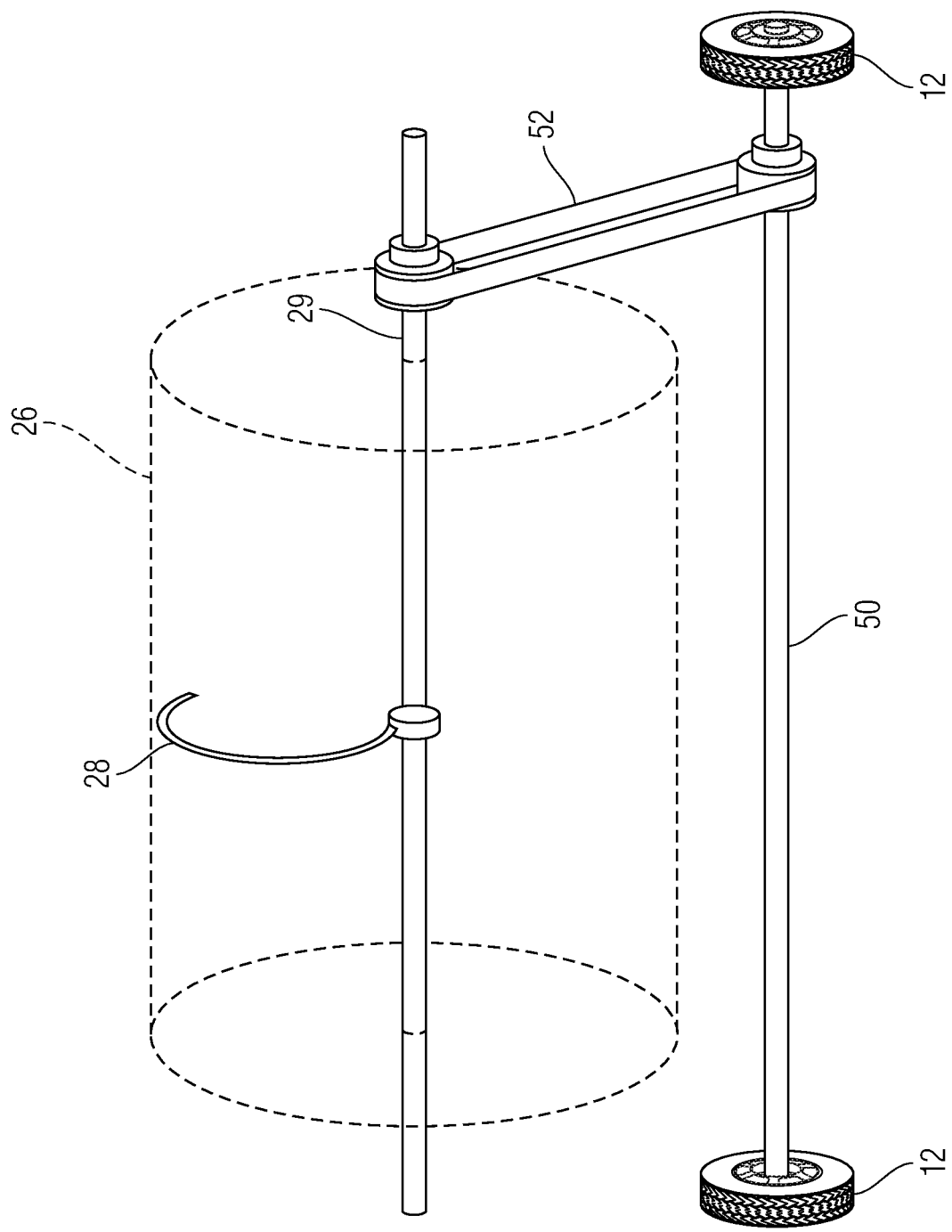
FIG. 6A is a back perspective view of the front pair of wheels and the receptacle of the device, and a transmission mechanism operatively coupling the front wheels and the receptacle in accordance with at least one embodiment of the present application.
Figure 6B:
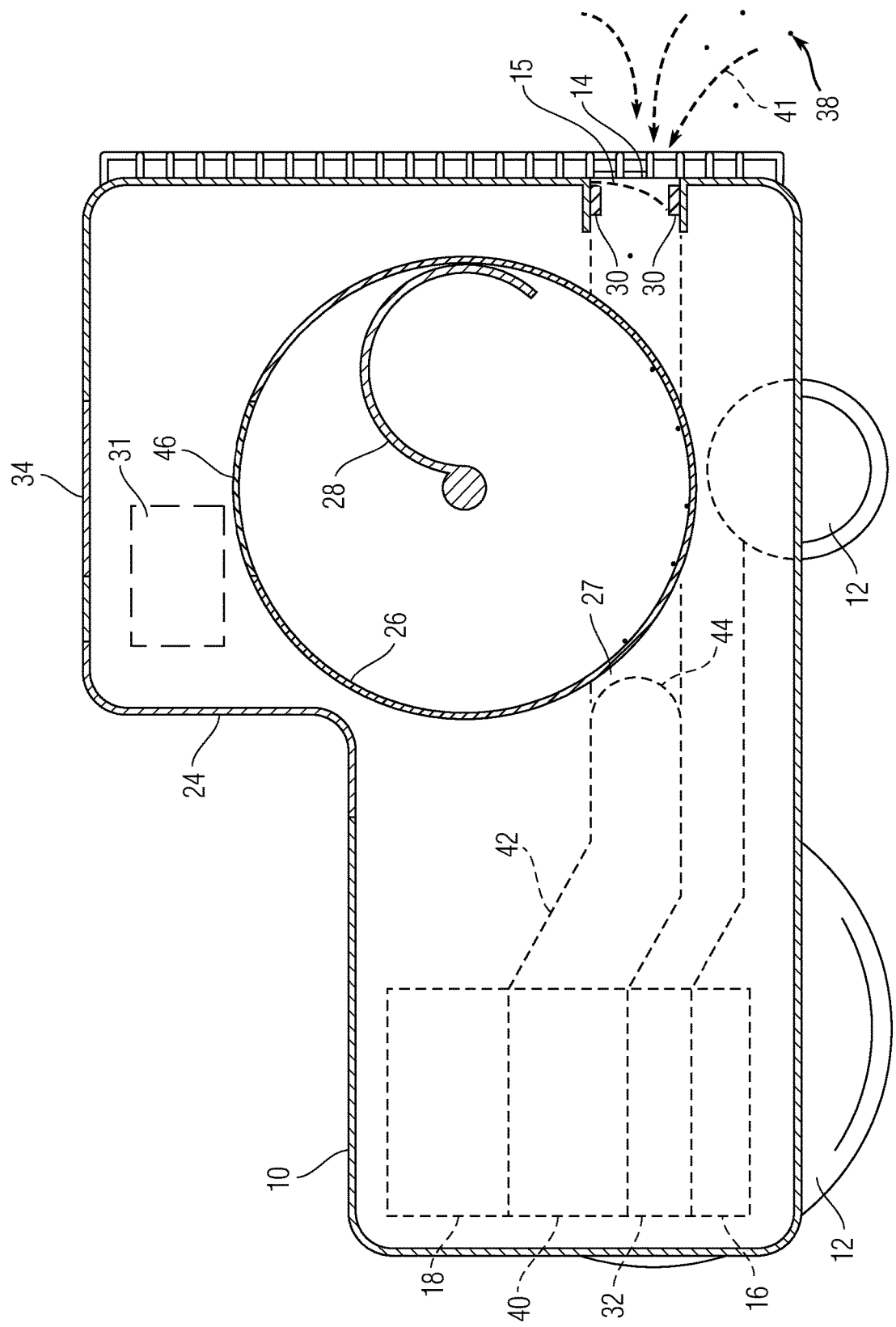
FIG. 6B is a cross-sectional view of the device of FIG. 5, the cross-section being cut along the 6-6 axis.
Figure 6C:
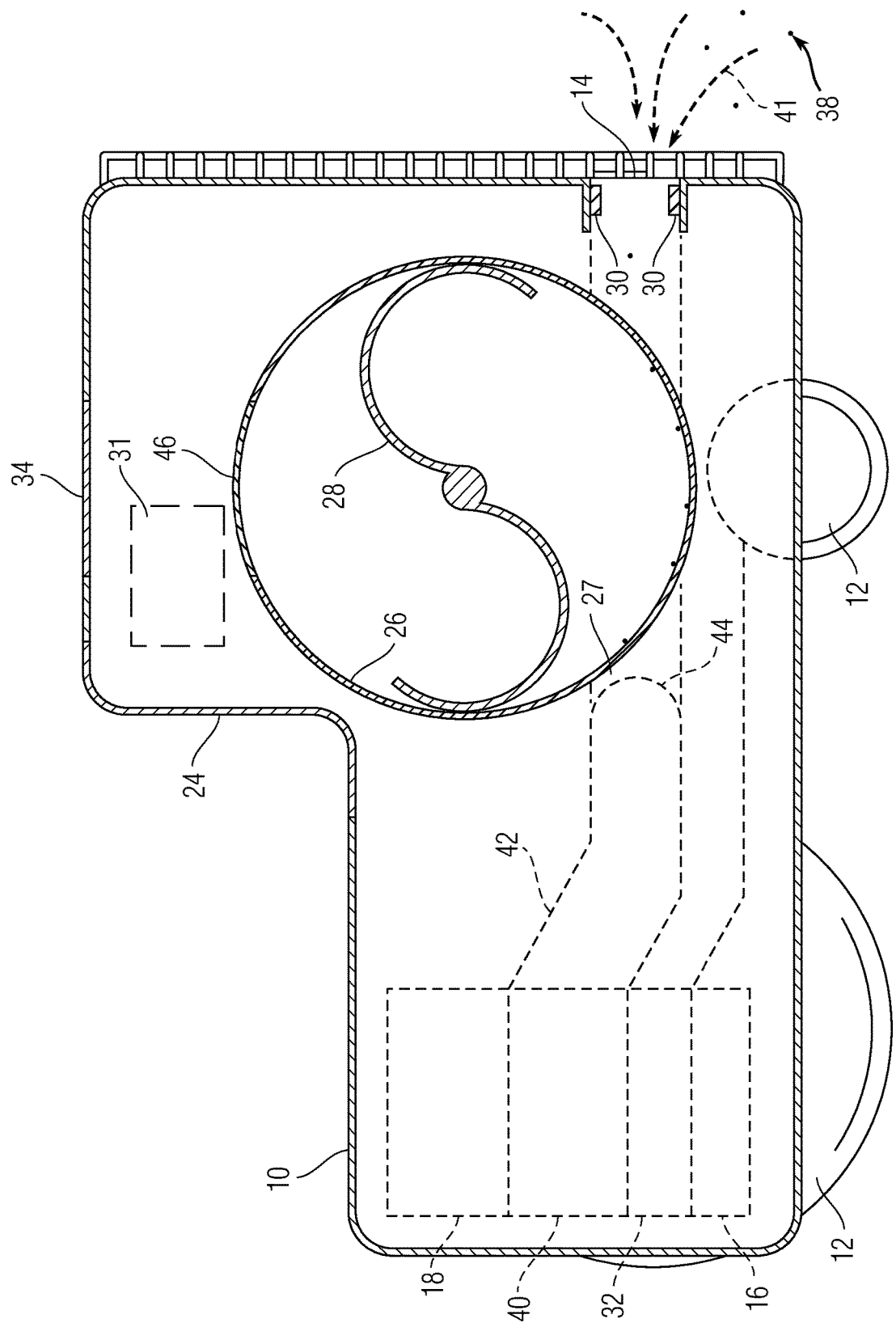
FIG. 6C is another configuration of the device in FIG. 6B, having two rotatable arms in accordance with at least one embodiment of the present application.
Figure 6D:
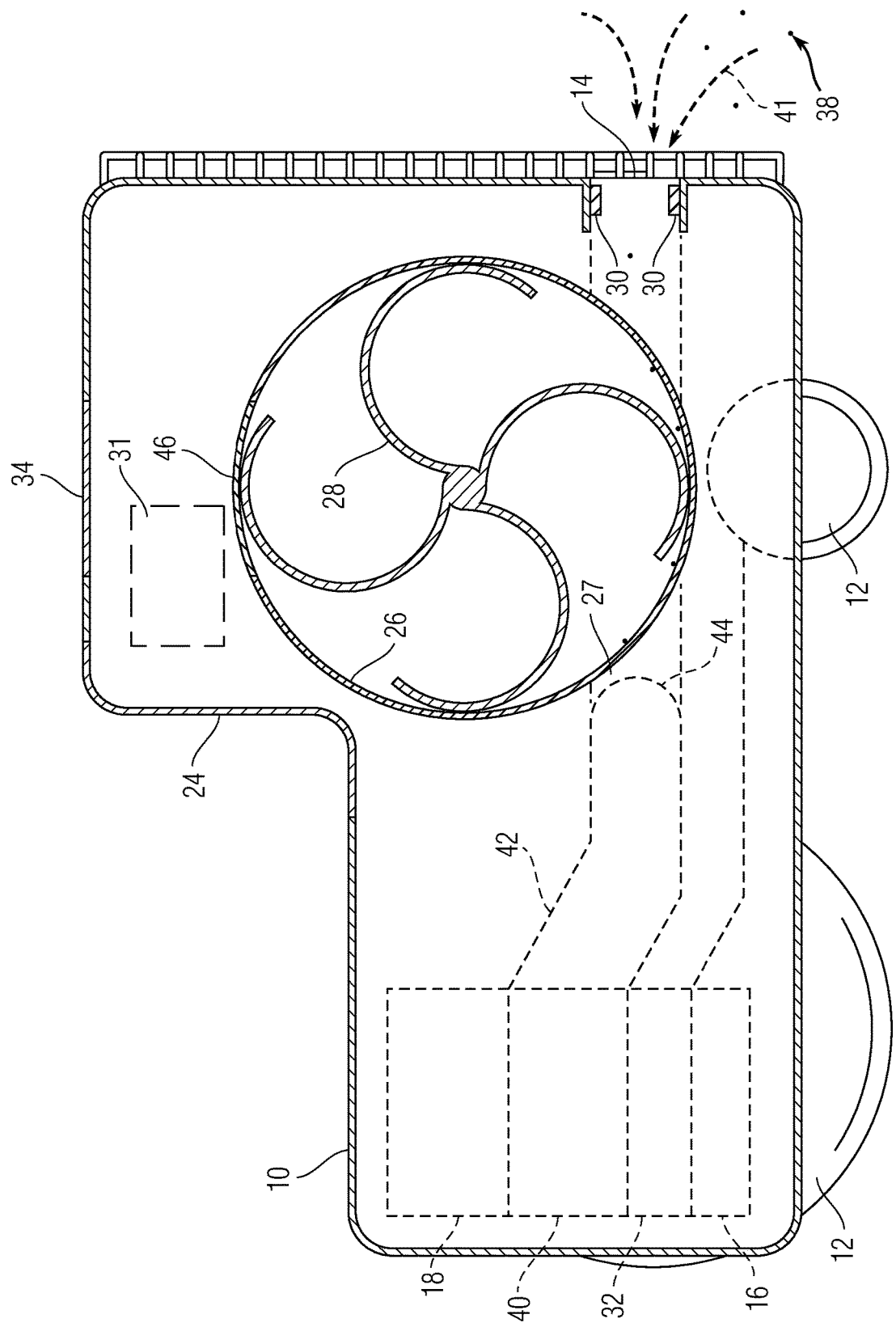
FIG. 6D is another configuration of the device of FIG. 6B, having four rotatable arms in accordance with at least one embodiment of the present application.
Figure 7:
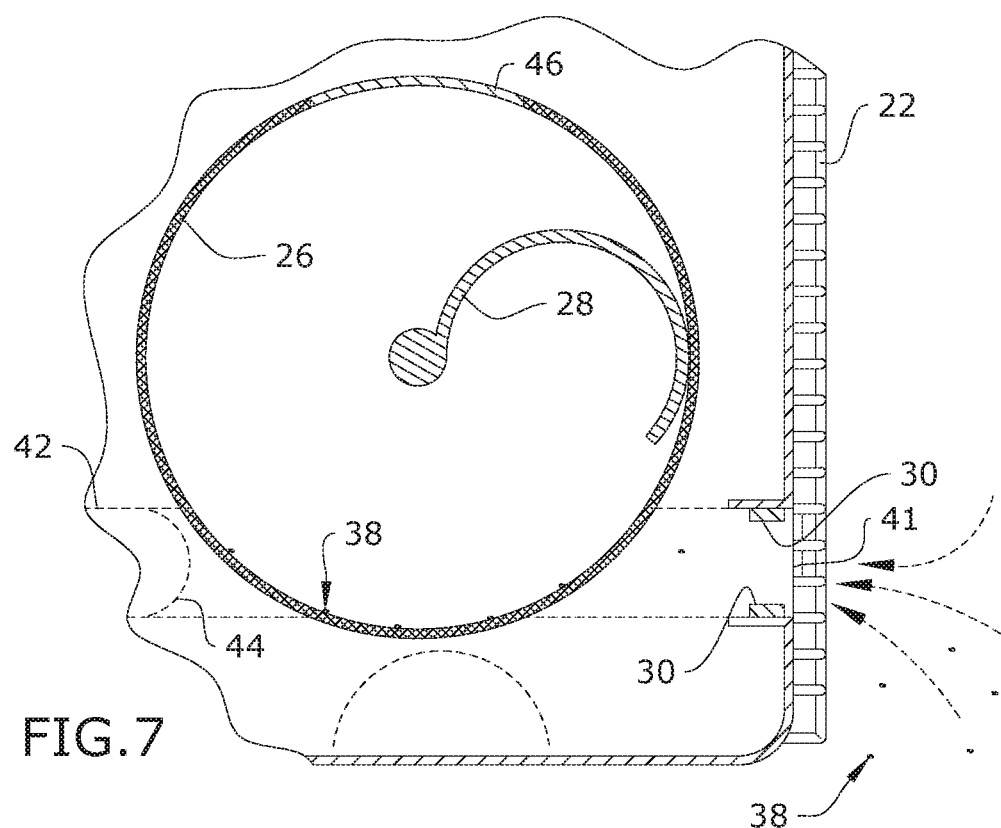
FIG. 7 is a detail cross-sectional view of the device of FIG. 6B with the inner arm sweep being in an exemplary initial configuration.
Figure 8:
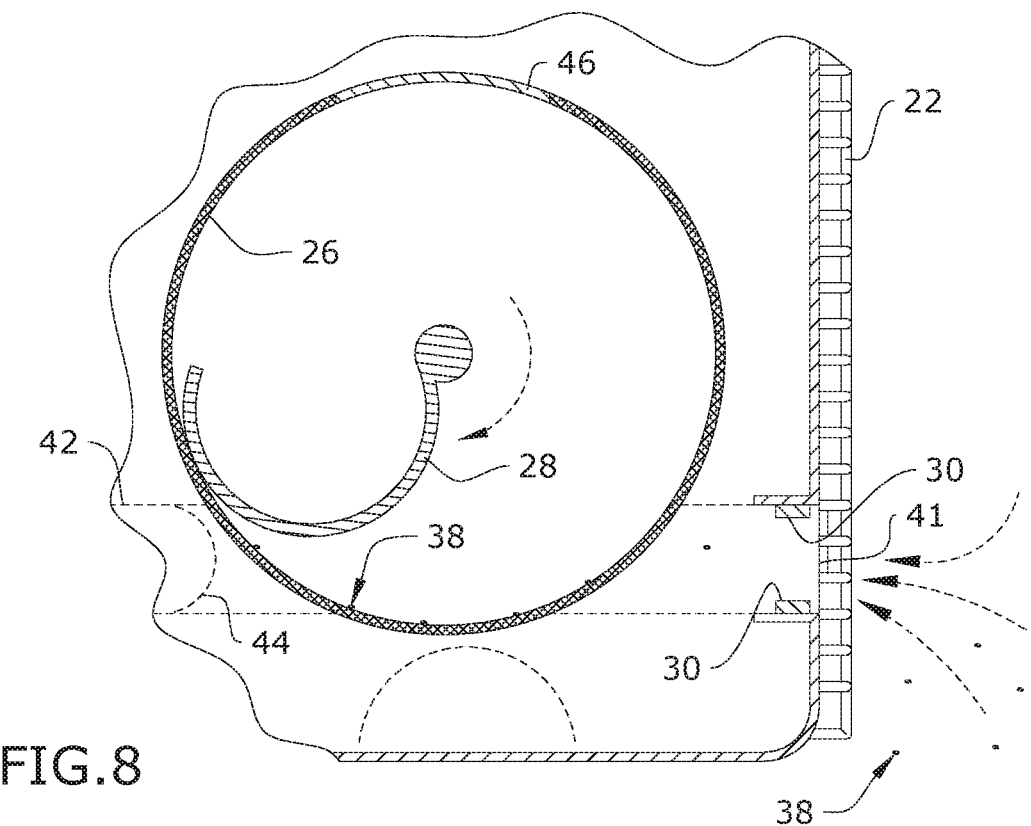
FIG. 8 is a detail section view of the device of FIG. 6B with the inner arm sweep in an exemplary secondary configuration.

With reference now to FIGS. 1-3 a robotic device 5 for capturing and eradicating ticks is provided. The device 5 includes a housing 10, one or more wheels 12 and an opening 14 on a front surface of the housing. The housing 10 can be plastic molded and is not limited to the shape depicted in FIG. 1, but rather it can be sized and shaped in various ways as long as it contains the various components and features described herein. In the exemplary embodiment depicted in the Figures, the opening 14 is a rectangular shaped opening that runs the longitudinal width of the device 5. The opening 14 is made to be as wide as possible to provide the greatest surface area for capturing ticks. The opening 14 is located on a lower portion of the front surface and has a narrow height (e.g., between 1 and 3 inches). In a particular embodiment, the opening 14 has a height of 1.5 inches. In one or more embodiments, the opening 14 is between 2-4 inches off the ground. In a particular embodiment, the opening 14 is 3.5 inches off the ground. In one or more embodiments, a flexible film covers the opening 14. The flexible film functions as a flap that covers the opening 14 in a resting state, and which flexes inward toward the inside of the housing 10 when a force is applied to it (see, for example, FIG. 6B showing flap 15 in dashed lines flexing inward toward the housing 10). The wheels 12 are made of rubber, steel, metal alloys, plastic or other materials suitable for traversing grass and wooded areas, as is known in the art. The wheels 12 can be different types of wheels, such as rubber wheels, omni-wheels, mecanum wheels, ball casters, or treads. The one or more wheels 12 can also be differently sized. For example, in the embodiment shown in FIGS. 1-3, the device 5 includes two small front wheels and two large back wheels positioned on opposite sides of the device. In other embodiments, the wheel arrangement is reversed—i.e., the front wheels are larger than the back wheels. The size and type of wheel 12 selected for the device can be dependent on the type of territory the device 5 covers—e.g., low or high grass, wooded areas, concrete, etc. In other words, the height of the device 5 can be adjusted by using smaller or bigger wheels, depending on the type of terrain the device 5 is traversing across.

The device 5 is powered by an on-board battery 16 contained within the housing 10. The battery 16 can be, for example, a lithium-ion battery pack or one or more alkaline batteries. The battery 16 is preferably rechargeable by connection of a charging dock located on the outer surface of the device 5 to a corresponding "home" charging station remote from the device (not shown). As such, the device 5 can be connected to the charging dock and allowed to re-charge the battery 16 when the device is not in use. Each of the elements of the device 5 that needs a power source are provided such by the battery 16, including a motor 32 to drive the vehicle (i.e., drive the wheels 12), and many of the features discussed below including rain sensor 18, theft deterrent 20, the rotatable arm 28, the heat strips 30, and the vacuum mechanism 40. For example, the battery 16 is operatively connected to the motor 32, and the motor 32 is configured to drive the wheels 12. When the motor 32 is powered, the motor drives the device 5 (wheels 12) to traverse a pre-determined coverage area. The coverage area can be indicated by perimeter strips or strategically located sensor stations outlining the property to be patrolled.

In one or more embodiments, a screen or grill 22 is positioned on the front of the device 5 to cover at least the opening 14. In some embodiments, the screen 22 covers only the opening 14. In other embodiments, the screen 22 covers the entire front surface of the device 5. The screen 22 can be made of a stiff wire cage or other suitable materials for creating a mesh that have spacing sized and shaped to allow ticks to pass through, but not larger debris. For example, the screen 22 can be composed of a grid in which each square is sized to be between 10 mm by 10 mm to 13 mm by 13 mm. The grid of the screen 22 can be composed of identical grid squares, or can have differently sized squares in order to best permit ticks into the device 5 while avoiding debris. The screen 22 is an optional feature, as the screen is removable, as shown in FIG. 3.

With reference to FIG. 2 now, in one or more embodiments, the robotic device 5 includes a theft deterrent 20, a filter panel 24, and/or a screw off cap 36. The theft deterrent 20 can be an electronic code panel for inputting a PIN code or password, a sequence of button presses, or it can be a physical lock. The filter panel 24 is an accessible panel that can be lifted up to permit access to the inside of the housing 10. The screw off cap 36 is arranged on a side of the housing 10. In one or more embodiments, the device 5 includes a pair of screw off caps 36 arranged on opposing sides of the device. The screw off caps 36 are shaped to have threaded ridges for fastening to the housing 10 and/or receptacle 26.

In order to improve attraction of ticks to the device 5, the device 5 includes one or more heat strips 30 arranged at or adjacent to the opening 14. The heat strips 30 can run the length of the opening 14 along the opening's upper and lower lips, or can be positioned as separate heat emitters at different places along the opening. For example, the heat strips 30 can be placed equidistant from one another along the longitudinal width of opening 14. In one or more embodiments, the heat strips 30 constitute heat bulbs or lamps. Such bulbs can be made of ceramic, porcelain, glass, or quartz. In one or more embodiments, the heat strips 30 include conductive elements. The conductive elements can be connected to the power source of the device 5, such as the battery 16, in order to heat the heat strips 30. The conductive elements can come in the form of carbon fibers, metal wiring, or gas filled tubes, which are positioned on the lips of the opening 14, embedded in the lips of the opening to be partially open to the air, or are fully contained within the housing surrounding the opening, in one or more embodiments. In one or more embodiments, the conductive elements of the heat strips 30 are placed within the housing surrounding the opening 14 and on the outer surface of the lips of the opening. In one or more embodiments, the heat strips 30 are infrared heat strips. Preferably, the heat strips 30 emit heat at a temperature over the range of normal human body temperature in order to replicate a human presence. For example, the heat strips 30 emit heat between 95-100 degrees Fahrenheit. In a particular embodiment, the heat strips 30 emit heat at 98.6 degrees Fahrenheit.

In one or more embodiments, the device includes a carbon dioxide emitter 31 ("$CO_2$ emitter") that provides additional tick attraction properties to the device 5. The $CO_2$ emitter 31 is arranged to provide carbon dioxide through or adjacent to the opening 14 and/or through or adjacent to the receptacle 26. Ticks are attracted to carbon dioxide and the addition of a $CO_2$ emitter will increase the tick capture rate. The $CO_2$ emitter 31 can be located wholly within the housing 10 or at the housing opening 14. In some embodiments, there are passageways or tubing in which the $CO_2$ emitter 31 can be used to direct carbon dioxide to desired areas of the device. For example, the $CO_2$ emitter 31 can pass carbon dioxide through a portion of the receptacle 26 via one set of passageways or tubing, while at the same time passing carbon dioxide to the opening 14 via a second set of passageways or tubing. In one or more embodiments, the $CO_2$ emitter 31 passes carbon dioxide through a top portion of the receptacle 26 so the carbon dioxide wafts through the receptacle to attract ticks therein. Carbon dioxide is stored within a cartridge or canister within the housing 10 and is passed to the $CO_2$ emitter 31 via pressure, such as by triggering releasable valves.

Turning to FIGS. 4 and 6A-6D, the screw off cap 36 can be twistably removed to permit access to different portions of the inside of the housing 10 for cleaning or other maintenance. In a preferred embodiment, when the screw off cap 36 is removed, it permits access to a receptacle 26. In one or more embodiments, the screw off cap 36 threadly engages an opening of the receptacle 26. The receptacle 26 is an internal chamber within the housing 10 that is directly or indirectly has a connection to the opening 14. For example, the receptacle 26 can abut or be adjacent to the opening 14, or an intermediate passageway can connect the opening to the receptacle, as in FIG. 6B. The receptacle 26 can be various shapes, such as square, triangular, or other, but in a preferred embodiment, the receptacle 26 is cylindrically shaped. In one or more embodiments, the receptacle 26 includes a portion that is accessible by ticks that are drawn through the housing opening 14. For example, this accessible portion of the receptacle 26 can be a mesh, a grid, or other type of opening oriented in the direction of the housing opening 14. The accessible portion is designed to have one or more openings that are large enough to permit ticks to pass through, but small enough to avoid passing larger debris that has entered through the housing opening 14. In one or more embodiments, the accessible portion is at the interface between the receptacle 26 and an intermediate passageway connected to the opening 14. In one or more embodiments, the entirety of the receptacle 26, or large portions thereof, are permeable such to permit free airflow, but not so permeable so as to allow ticks captured in the receptacle to pass out through non-accessible portions. For example, the airflow accessible portions of the receptacle 26 include one or more air filters 27.

Figure 5:
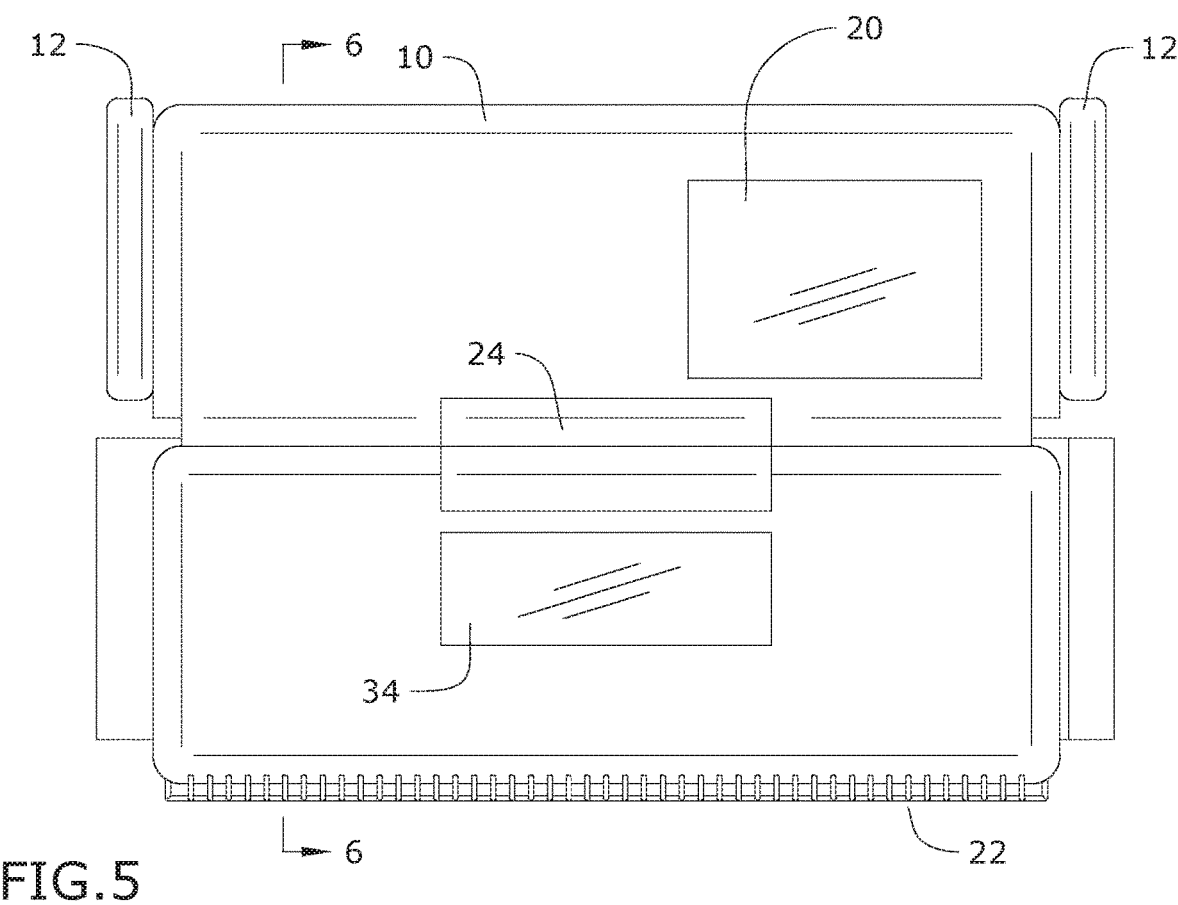
FIG. 5 is a top view of a device in accordance with at least one embodiment of the present application.

Further, the receptacle 26 is accessible by opening the filter cover 24 as shown in FIGS. 5-6. The level of debris captured in the receptacle 26 can be determined by looking through a transparent window 34 in the housing 10, which is located above a transparent viewing window 46 in the outer surface of the receptacle in one or more embodiments. If the receptacle 26 is full, a user can remove the screw off cap 36 and empty the contents of the receptacle for disposal.

In order to better draw ticks into the receptacle 26, a vacuum mechanism 40 is contained with the housing 10 and is oriented toward the housing opening 14. In one or more embodiments, the vacuum mechanism 40 includes or is coupled with a vacuum chamber 42 and a vacuum filter 44. These additional parts form a connection to the receptacle 26. When the device 5 is powered on by the battery 16, the vacuum mechanism 40 generates a suction force of airflow along the pathway as shown in FIG. 6B. As the device 5 moves through its coverage area it encounters ticks (shown by the exemplary ticks 38 in FIG. 6B), the suction force generated by the vacuum mechanism 40 pulls the ticks through the housing opening 14 and through any intermediate passageways, and through an accessible portion of the receptacle 26. In one or more embodiments, the vacuum suction strength is a variable setting that a user can control—e.g., via a high/low switch or a tunable knob. In one or more embodiments, the vacuum mechanism 40 and/or the vacuum filter 44 are accessible via the filter cover 24 to permit cleaning or repair.

The vacuum mechanism 40 is advantageously used in conjunction with other attraction elements described herein. For example, the heat emitters 30 placed near the opening 14 initially draw ticks to the device 5 by imitating a human heat signature. Thereafter, a carbon dioxide emitter 31 draws the ticks further into the opening 14 or the receptacle 26. At the same time, the suction force provided by the vacuum mechanism 40 further pulls the ticks into the device 5.

With reference now to FIGS. 6A-8, the device 5 includes a rotatable arm 28 disposed within the receptacle 26. The arm 28 may be connected to a central axle or shaft that runs along the longitudinal axis of the receptacle. The rotatable arm 28 is powered by the battery 16 to rotate about the inner circumference of the receptacle 26 to sweep its interior. To say that the rotatable arm is powered by the battery to rotate is to be understood as common phraseology that is often used in the mechanical arts, such as a "battery powered screwdriver" or "battery powered saw." It is understood by those of ordinary skill in the mechanical arts that, in these examples, even though a motor is not always mentioned, the rotation of the screwdriver shaft or reciprocation of the saw blade is achieved using a motor to convert the electrical energy stored in the battery to mechanical movement (see, e.g., U.S. Pat. No. 7,456,608, entitled "Battery-driven screwdriver," and U.S. Pat. No. 9,132,491, entitled "Portable battery-powered reciprocating saw"). For example, U.S. Pat. No. 6,161,292 is directed to a string trimmer device and states that the "rotating head may be powered by a battery." While using this common phraseology, it is more specifically explained that a motor is provided that converts the battery energy to rotational movement. Similarly, U.S. Patent Pub. No. 2008/0196184 is directed to a toothbrush and states that the power source, such as a battery, "provides power to both the light source and oscillating or rotating bristles." Again, while using this common phraseology that does not specifically mention a motor, it is further explained that a motor is provided that converts the battery energy to rotate or oscillate the bristles. In accordance with this common phraseology, as would be understood by one of ordinary skill in the art, with respect to the rotatable arm 28 that is powered by the battery 16 to rotate, the use of a motor to convert the battery's energy to rotational movement is more specifically described below.

As mentioned previously, the battery 16 is operatively connected to the motor 32 and provides power to the motor 32, and the motor 32 is configured to drive the wheels 12. The motor 32 that drives the wheels 12 can also converts the power of the battery to rotate the rotatable arm 28. Specifically, in one or more embodiments as shown in FIG. 6A, rotatable arm 28 is connected to a central axle or shaft 29 that runs along the longitudinal axis of the receptacle. The wheels 12 can also be connected to a central axis or shaft 50 that rotates with drive wheels 12. Shaft 50 can be operably coupled to shaft 29 via a transmission mechanism 52 such that rotation of the shaft 50 causes rotation of shaft 29 and rotatable arm 28. The transmission mechanism 52 can include a pair of pulleys and a belt (see FIG. 6A), a gear or gear set, a chain and sprocket system, or other suitable transmission devices, for example. The belt of the transmission mechanism 52 can be made of rubber, for example.

In one or more embodiments the transmission mechanism 52 can be operatively coupled to the shaft 50 of the front pair of wheels 12 (i.e., the pair of wheels proximate to the housing opening 14) as shown in FIG. 6A. In at least one embodiment, the transmission mechanism 52 can be operatively connected to the shaft 50 of the rear pair of wheels 12 (i.e., the pair of wheels proximate to the battery 16). The belt around the two pulleys of the transmission mechanism 52 serves to translate rotation of the shaft 50 into rotation of the shaft 29. In other words, rotation of the pair of wheels 12 (and thus rotation of the shaft 50) when the wheels 12 are driven causes rotation of the shaft 29 via transmission mechanism 52, as well as corresponding rotation of the arm 28 connected to the shaft 29. The rotatable arm 28 rotates about the inner circumference of the receptacle 26 to sweep its interior. As the arm 28 sweeps, it forcibly applies pressure to ticks who have been drawn into the receptacle 26 by the vacuum, thereby crushing and killing the ticks. In one or more embodiments, the rotatable arm 28 is capable of rotating a full 360 degrees about the interior of the receptacle 26.

As such, in at least one embodiment, the transmission mechanism 52 can be controllable to modulate the speed of rotation of the rotatable arm 28 in the receptacle 26. For instance, in an embodiment in which the shaft 29 is connected to the shaft 50 of the front pair of wheels 12 via transmission mechanism 52, the speed at which the front pair of wheels 12 move can control the rotational speed of the arm 28 that applies pressure to the ticks drawn into the receptacle. In at least one embodiment, the speed of the arm 28 can be mechanically adjusted in other ways, such as through gearing or other clutch or transmission mechanisms operatively connected to the shaft 50 of the pair of wheels 12 and shaft 29, for example. The transmission mechanism 52 can also be directly connected to the output shaft of motor 32 rather than shaft 50.

Accordingly, rotatable arm 28 rotates using the same motor 32 that drives the wheels 12. This arrangement reduces the number of motors since the rotation of arm 28 and wheels 12 are both powered via battery 16 through motor 32. It is also possible to rotate arm 28 using a second, separate motor. The second motor can receive power from battery 16 and translate the battery power to rotational movement. The output shaft of the motor can be directly connected to shaft 29 to cause rotation of arm 28. The second motor and shaft 29 can also be operably coupled via a transmission system, such as a belt and pulley, gear set, sprocket and chain, or the like, to transmit the rotational movement of the output shaft of the second motor to cause the rotation of shaft 29. Using a separate, second motor to rotate arm 28 can provide for easier independent control of the drive wheels 12 and arm 28.

While the arm 28 shown in the exemplary embodiment of FIG. 6B is hook or arcuate shaped, the arm is not limited to such shapes. The arm 28 can be straight or shaped differently to match the contours of the receptacle 26. Further, in one or more embodiments, an end portion of the arm is made of flexible material. The arm 28 itself could be composed of the flexible material, or the flexible material could be sheathed over the end of the arm. For example, the flexible material can be a rubber or vinyl pad. In any case, the arm 28 is desirably very wide, up to the longitudinal with of the receptacle. In one or more embodiments, the flexible portion of the arm 28 is wider than main portion of the arm to increase the surface area covered by the arm. For example, the flexible portion can be the length of the entire receptacle 26. Advantageously, if the arm 28 includes a flexible portion, as the arm abuts and sweeps the inner surface of the receptacle 26, the flexible portion moves with the contour of the inner circumference of the receptacle, thereby providing a more close-fitting contact to the surface and increased ability to crush captured ticks.

In one or more embodiments, the $CO_2$ emitter 31 passes carbon dioxide into the receptacle 26 through a hole or filter in the surface of the receptacle 26, at which point the sweep of the rotatable arm 28 fills the receptacle with carbon dioxide. The sweep of the arm 28 also directs the carbon dioxide toward the opening 14. In one or more embodiments, the $CO_2$ emitter 31 passes carbon dioxide through the air filter 27. The sweep of the rotatable arm 28 does not directly contact the $CO_2$ emitter 31.

In one or more embodiments, the device 5 includes more than one arm within the receptacle 26. For example, there can be two arms in the receptacle in which each arm rotates in the same direction so as to continually eradicate additional ticks (see FIG. 6C). Other arm configurations are contemplated as well, such as two or four arm arrangements (see FIG. 6D), each arm covering 90 or 180 degrees of the inner circumference of the receptacle 26. The arms may rotate clockwise or counter-clockwise, or alternate between the two as the arms contact one another. In some embodiment, first rotatable arm moves in a clockwise direction and a second rotatable arm moves in a counter-clockwise direction. In such an embodiment, when the two arms meet the arms reverse direction. In other embodiments, the device 5 includes a plurality of arms staggered along the width of the central shaft within the receptacle 26, in which each arm is rotationally offset by a set degree and offset by a longitudinal distance from one another. The shafts rotation of the plurality of arms thereby mimics a twisting "screw" in sweeping the inner circumference of the receptacle 26. In one or more embodiments, tach of the plurality of arms includes a flexible portion to enhance sweeping.

In addition to the above, the application herein contemplates devices including additional features relevant to device movement. A rain sensor 18 is included in one or more embodiments that can sense whether moisture is landing on the device 5, and if so, can direct the device to return to the "home" base as set forth by perimeter strips or sensor stations. In one or more embodiments, the device 5 includes one or more bumper sensors 48. Bumper sensors 48 can be located on the outer surface of the device and are designed to indicate the device's proximity to outdoor obstacles. Preferably, the bumper sensors 48 are located on the top or upper half of the device so that the sensors only detect large obstacles capable of impeding device progress. For example, the bumper sensors 48 can be configured to activate only if they identify an obstacle that is greater than three inches tall. The bumper sensors 48 can be located wherever necessary on the device 5 to determine the device's surroundings. For example, the bumper sensors 48 can be behind the wire mesh 22 or within the housing 10.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various implementations of the present application have been described above, it should be understood that they have been presented by way of example, and not limitation. It would be apparent to one skilled in the relevant art(s) that various changes in form and detail could be made therein without departing from the spirit and scope of the application. Thus, the present application should not be limited by any of the above-described example implementations.

ITEMIZED LIST OF ELEMENTS

5: robotic device
10: device housing
12: wheels
14: housing opening
16: battery or power source
18: rain sensor
20: theft deterrent
22: screen
24: filter panel
26: receptacle
27: air filter
28: rotatable arm
29: shaft of the receptacle
30: heat strips
32: motor
31: $CO_2$ emitter
34: transparent window
36: screw-off cap
38: exemplary ticks
40: vacuum mechanism
42: vacuum chamber
44: vacuum filter
46: transparent viewing window
48: bumper sensors
50: shaft of a pair of wheels

What is claimed:

1. A robotic device for eradicating ticks comprising:
   a motor powered by a battery;
   at least one pair of wheels driven by the motor to move the device in a direction of travel;
   a housing having a housing opening on a front surface of the housing, wherein the housing opening extends transverse from a bottom surface of the housing from which the one or more wheels extend and extends an entire width of the front surface of the housing, and wherein the front surface of the housing faces the direction of travel of the device;
   a receptacle disposed within the housing;
   a shaft disposed longitudinally within the receptacle and operatively coupled to the at least one pair of wheels via a transmission mechanism;
   at least one rotatable arm coupled to the shaft within the receptacle;
   a vacuum mechanism disposed within the housing and arranged to generate a suction force through the opening to the receptacle when activated by the battery; and
   wherein the at least one rotatable arm includes a flexible portion disposed at an end of the rotatable arm which abuts an inner surface of the receptacle and wherein the rotatable arm causes the flexible portion of the rotatable arm to sweep along the circumference of the inner surface of the receptacle by rotating up to 360 degrees, and wherein the driving of the at least one pair of wheels causes a rotation of the at least one rotatable arm via the transmission mechanism.

2. The device according to claim 1, wherein the device comprises at least two rotatable arms.

3. The device according to claim 2, wherein the device comprises 4 rotatable arms, wherein each of the 4 rotatable arms are separated by 90 degrees of the inner circumference of the receptacle.

4. The device according to claim 1, wherein the flexible portion of the at least one rotatable arm that abuts the inner surface of the receptacle is comprised of rubber or vinyl.

5. The device according to claim 1, wherein the at least one rotatable arm rotates up to 360 around the inner surface of the receptacle.

6. The device according to claim 1, further comprising a passageway coupling the housing opening and the receptacle.

7. The device according to claim 6, wherein the receptacle includes one or more openings at an interface of the passageway and the receptacle is sized and shaped to pass ticks through.

8. The device according to claim 1, wherein a portion of the receptacle surface includes a permeable air filter sized and shaped to pass the suction force and not to pass ticks.

9. The device of claim 8, wherein the air filter comprises dimensions of 1 mm by 1 mm.

10. The device according to claim 1, further comprising a wire mesh disposed on the front surface of the housing that covers the housing opening, wherein each opening of wire mesh sized between 10 mm by 10 mm to 13 mm by 13 mm.

11. The device according to claim 1, wherein the height of the device is adjustable.

12. The device according to claim 1, further comprising a carbon dioxide emitter that dispenses carbon dioxide through the housing opening.

13. The device according to claim 12, wherein the carbon dioxide emitter is disposed within the receptacle.

14. The device according to claim 13, wherein rotation of the at least one rotatable arm directs carbon dioxide through the housing opening.

15. The device according to claim 1, wherein a height of the housing opening is 1-3 inches and wherein the housing opening is located on the front surface of the housing at a height of 2-4 inches from the ground.

16. The device according to claim 1, further comprising a transparent window located on a top portion of the housing above the receptacle, and a viewing window in an outer surface of the receptacle, wherein contents of the receptacle can be viewed from the outside of the housing through transparent window and the viewing window.

17. The device according to claim 1, further comprising one or more heat strips disposed at the housing opening, wherein the one or more heat strips provide heat between 95-100 degrees Fahrenheit.

18. The device according to claim 1, further comprising at least one of a rain sensor, a bumper sensor, or a theft deterrent.

19. The device according to claim 1, further comprising a flexible film which covers the housing opening when the vacuum mechanism is not generating the suction force, and which flexes to reveal the housing opening when the vacuum mechanism generates the suction force.

20. A robotic device for eradicating ticks, the robotic device including at least one battery and at least one motor, the robotic device comprising:
   at least one pair of wheels configured for rotation to drive the device in a direction of travel;
   a housing having a housing opening on a front surface of the housing, wherein the housing opening extends transverse from a bottom surface of the housing from which the one or more wheels extend and extends an entire width of the front surface of the housing, and wherein the front surface of the housing faces the direction of travel of the device;
   a receptacle disposed within the housing;
   at least one rotatable arm disposed within the receptacle and configured for rotation;
   a vacuum mechanism disposed within the housing and arranged to generate a suction force through the opening to the receptacle; and
   wherein the at least one rotatable arm includes a flexible portion disposed at an end of the rotatable arm which abuts an inner surface of the receptacle and wherein upon a rotation of the rotatable arm, the rotatable arm causes the flexible portion of the rotatable arm to sweep along the circumference of the inner surface of the receptacle by rotating up to 360 degrees.

* * * * *